(12) United States Patent
Cheng (10) Patent No.: US 9,414,617 B2
(45) Date of Patent: Aug. 16, 2016

(54) AUTOMATIC BEAN CURD MAKER

(71) Applicant: Jui-Tai Cheng, Taichung (TW)

(72) Inventor: Jui-Tai Cheng, Taichung (TW)

( * ) Notice: Subject to any disclaimer, the term of this patent is extended or adjusted under 35 U.S.C. 154(b) by 386 days.

(21) Appl. No.: 14/010,830

(22) Filed: Aug. 27, 2013

(65) Prior Publication Data

US 2013/0340628 A1    Dec. 26, 2013

Related U.S. Application Data

(63) Continuation-in-part of application No. 12/569,900, filed on Sep. 30, 2010, now abandoned.

(51) Int. Cl.
*A23L 1/20* (2006.01)
*A23C 20/02* (2006.01)

(52) U.S. Cl.
CPC .............. *A23L 1/2006* (2013.01); *A23C 20/025* (2013.01)

(58) Field of Classification Search
CPC ........................ A23L 1/2006; A23C 20/025
See application file for complete search history.

(56) References Cited

U.S. PATENT DOCUMENTS

| | | | | |
|---|---|---|---|---|
| 3,635,147 A * | 1/1972 | Lee | A47J 36/165 | 366/147 |
| 3,994,117 A * | 11/1976 | Kinney | B65B 3/36 | 141/172 |
| 4,131,688 A * | 12/1978 | Grosclaude | A23C 19/0285 | 426/36 |
| 4,147,811 A * | 4/1979 | Abe | A23C 20/025 | 426/634 |
| 4,372,979 A * | 2/1983 | Reinbold | A23C 19/0323 | 426/36 |
| 4,534,283 A * | 8/1985 | Nakamuta | A23L 1/2006 | 99/468 |
| 4,756,243 A * | 7/1988 | Radford | A23C 19/0285 | 99/452 |
| 4,791,001 A * | 12/1988 | Matsuura | A23C 11/103 | 426/401 |
| 4,947,742 A * | 8/1990 | Nishibayashi | A23C 20/025 | 99/453 |
| 5,074,201 A * | 12/1991 | Takeyama | A23C 20/025 | 366/146 |
| 5,094,875 A * | 3/1992 | Chen | A23J 3/16 | 426/521 |
| 6,051,266 A * | 4/2000 | Totsuka | A23N 12/08 | 426/466 |
| 6,331,324 B1 * | 12/2001 | Tomita | A23C 20/025 | 426/634 |
| 6,467,403 B1 * | 10/2002 | Lagares-Corominas | A22C 11/02 | 222/368 |
| 6,531,176 B1 * | 3/2003 | Noguchi | A23C 20/025 | 426/442 |
| 6,652,133 B2 * | 11/2003 | Ghanizadeh Khoub | A21C 1/02 | 366/188 |
| 2003/0145736 A1 * | 8/2003 | Green | A47J 31/3633 | 99/280 |
| 2004/0123747 A1 * | 7/2004 | Lassota | A47J 42/50 | 99/510 |
| 2005/0103207 A1 * | 5/2005 | Hansen | A22C 7/0023 | 99/353 |
| 2007/0128335 A1 * | 6/2007 | Iwamoto | A23C 11/103 | 426/634 |
| 2009/0000494 A1 * | 1/2009 | Kim | A47J 43/0705 | 99/483 |
| 2010/0086660 A1 * | 4/2010 | Takai | A23C 11/103 | 426/518 |
| 2010/0323075 A1 * | 12/2010 | Takai | A23C 11/103 | 426/495 |

* cited by examiner

*Primary Examiner* — David Angwin
*Assistant Examiner* — John J Norton (57) ABSTRACT

An automatic bean curd maker is provided in the present invention. Soybeans and water are blended and grinded to produce raw bean pulp, and the raw bean pulp is boiled in a steamer to form bean pulp. The bean pulp is mixed and stirred with coagulator to form soy custard in a stirring tank. Specifically, a coagulator dosing device and a coagulator tank are connected circulatedly wherein the coagulator dosing device supplies a predetermined amount of coagulator to the stirring tank. The soy custard in the stirring tank falls into a molding container to be molded and pressed to form bean curd. Thus, bean curd can be produced automatically.

8 Claims, 8 Drawing Sheets

AUTOMATIC BEAN CURD MAKER

FIELD OF THE INVENTION

The present invention is a CIP of application Ser. No. 12/569,900, filed Sep. 30, 2009, the entire contents of which are hereby incorporated by reference

BACKGROUND OF THE INVENTION

Description of the Prior Art

Bean curds in conventional market, supermarket, or hypermarket are all fixed and mass-produced. The technique of conventional bean curd is going to disappear by its complicated and long processes. The adding of gypsum and water of the process controlled by an operator is such a waste time and man power so that people are not willing to step into especially in the modern industrial generation. The disadvantages of the prior art is that the inventor want to solve.

SUMMARY OF THE INVENTION

The main object of the present invention is to provide an automatic bean curd maker which automatically proceeds steps of grinding, boiling, blending, stirring, and molding.

To achieve the above and other objects, an automatic bean curd maker of the present invention adapted for producing bean curd made of soybean and a coagulator includes a grinding device, a bean supplier, a steamer, at least one stirring tank, a bean pulp supplier, a coagulator tank, a coagulator dosing device, a molding device, and pressing device.

The grinding device is adapted for grinding the soybeans and for blending the soybeans and water in order to form bean dregs and raw bean pulp. The bean supplier is adapted for supply a predetermined amount of soybeans to the grinding device. The steamer is adapted for boiling the raw bean pulp made by the grinding device in order to form bean pulp.

The stirring tank includes a first stirring device. The stirring tank is adapted for receiving and stirring the coagulator and the bean pulp made by the steamer in order to form soy custard. The stirring tank is formed with an opening on a bottom thereof wherein the opening is closed by a covering plate. The opening is opened when the covering plate is pushed upward. The bean pulp supplier is adapted for supplying the bean pulp made by the steamer to the stirring tank.

The coagulator tank is adapted for receiving the coagulator and includes a pump, a second stirring device, an output conduit, and an input conduit. The pump is adapted for pumping the coagulator in via the input conduit and for discharging the coagulator out via the output conduit. The second stirring device is adapted for stirring the coagulator received in the coagulator tank.

The coagulator dosing device includes a coagulator dosing cylinder, a first valve, a second valve, a third valve, and a draining conduit. The first valve is disposed between the outlet conduit and the inlet conduit. The second valve is disposed between a bottom of the coagulator dosing cylinder and the outlet conduit. The third valve is disposed on the bottom of the coagulator dosing cylinder so as to alternatively allow the coagulator in the coagulator dosing to be discharged into the stirring tank. An end of the draining conduit being connected to a portion of the coagulator dosing cylinder which is located at a predetermined height from the bottom of the coagulator dosing cylinder, and an opposite end of the draining conduit being connected to the inlet conduit.

The molding device is located below the stirring tank and is liftable. The molding device includes a molding container which is able to push the covering plate in order to open the opening when lifted so as to allow the soy custard to fall into the molding container. The soy custard is molded in the molding container.

The pressing device is adapted for pressing the soy custard in the molding container for extracting water in order to form bean curd.

Specifically, when the first valve is opened, and the second valve and the third valve are both closed, the coagulator enters the coagulator dosing cylinder from the outlet conduit via the first valve, and excess coagulator flows back into the inlet conduit via the draining conduit. On the contrary, when the first valve is closed, and the second valve and the third valve are both opened, coagulator from the coagulator tank flows to the inlet conduit from the outlet conduit via the second valve, and the coagulator accumulated in the coagulator dosing cylinder is discharged into the stirring tank via the third valve.

Thereby, the automatic bean curd maker of the present invention is able to automatically proceed steps from grinding to molding. In addition, the soy custard can be stirred better, and the coagulator is kept flowing so as to prevent from precipitating.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIG. 1 to FIG. 10 for a major embodiment of the present invention. The automatic bean curd maker of the present invention is adapted for producing bean curd made of soybeans and a coagulator, such as gypsum solution. The automatic bean curd maker of the present invention includes a grinding device 10, a bean supplier 20, a steamer 30, at least one stirring tank 40, a bean pulp supplier 50, a coagulator tank 70, a coagulator dosing device 60, a molding device 80, a pressing device 90, and a water tank 100.

Figure 1:
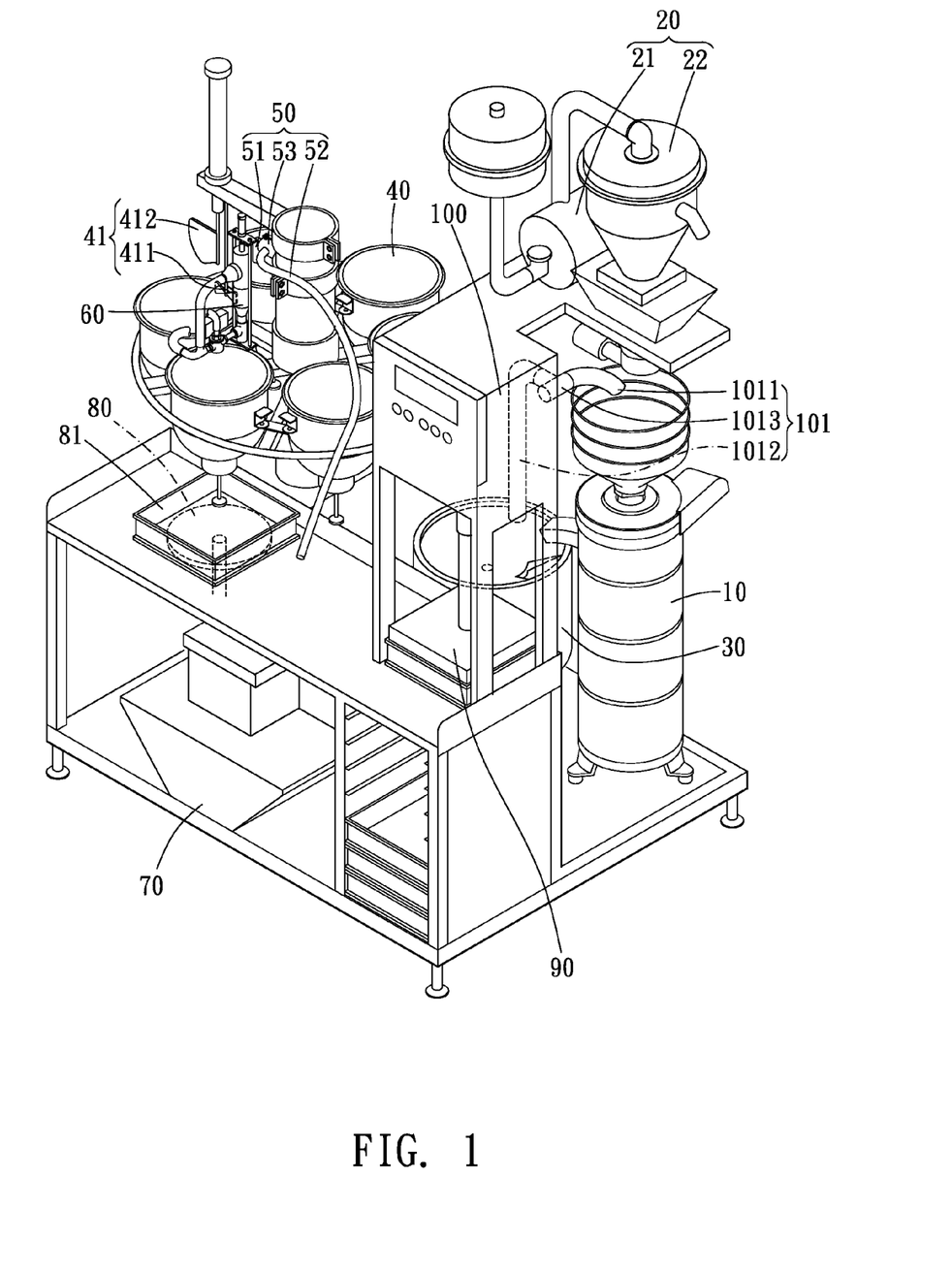
FIG. 1 is a stereogram of the present invention.
Figure 2:
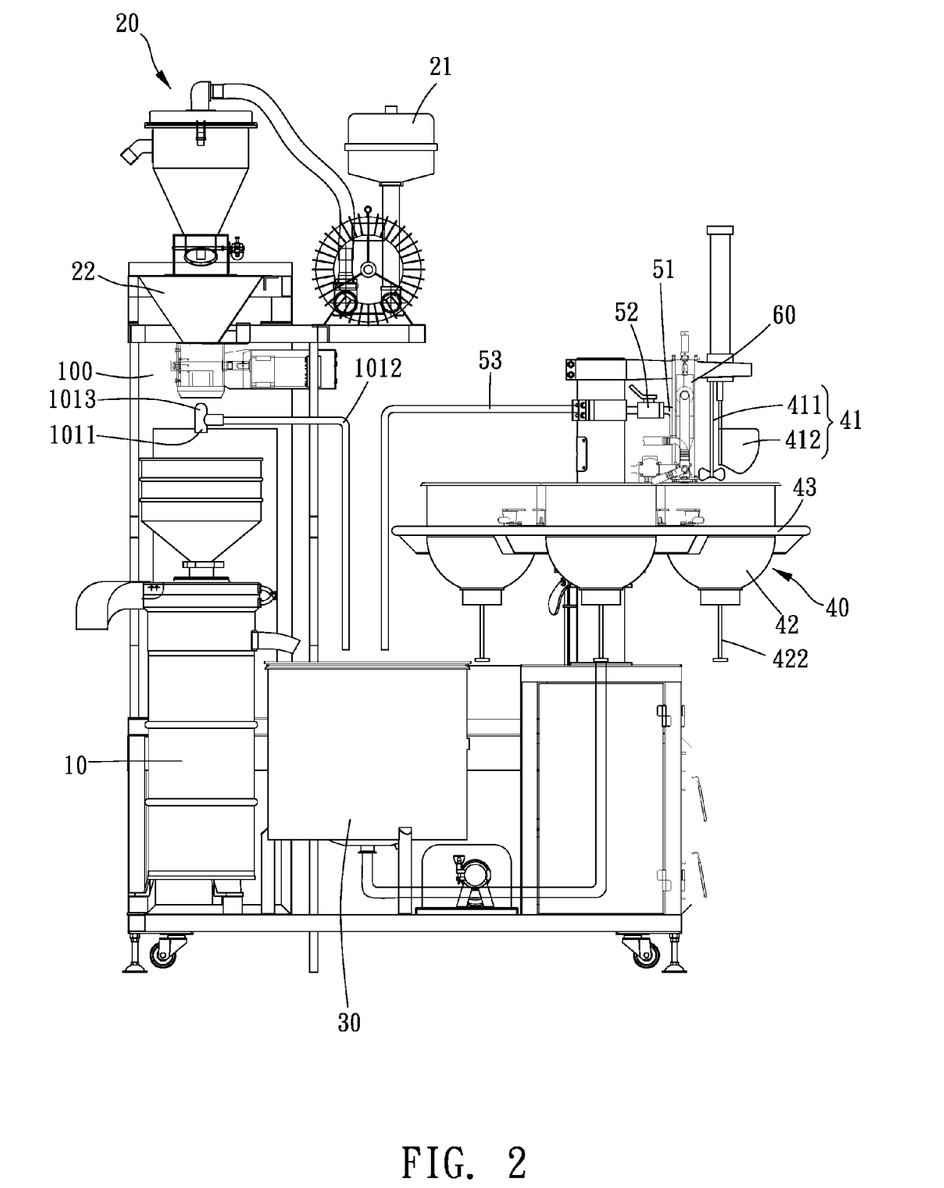
FIG. 2 is a rear view of the present invention.
Figure 3:
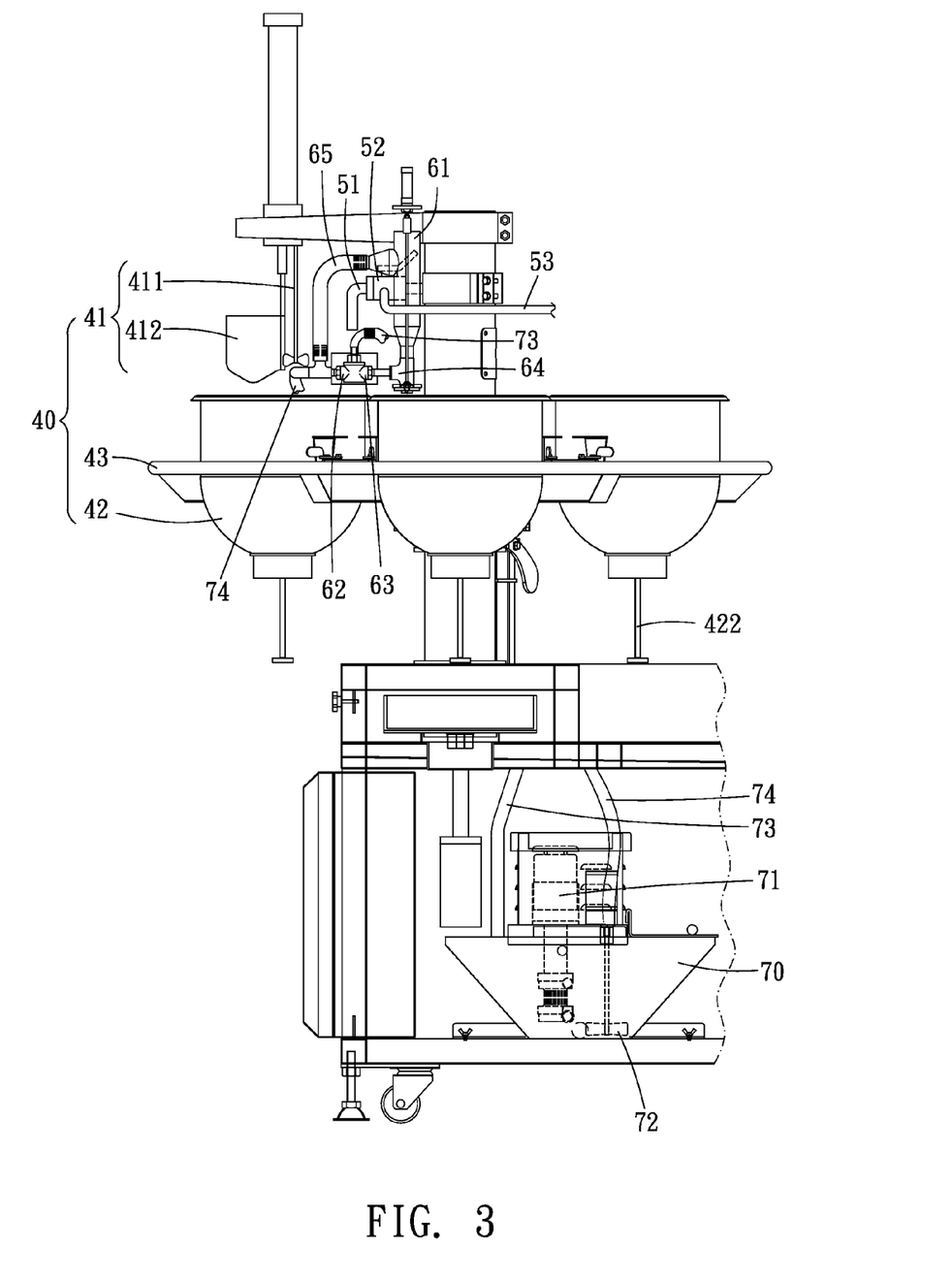
FIG. 3 is a partial front view of the present invention.
Figure 4:
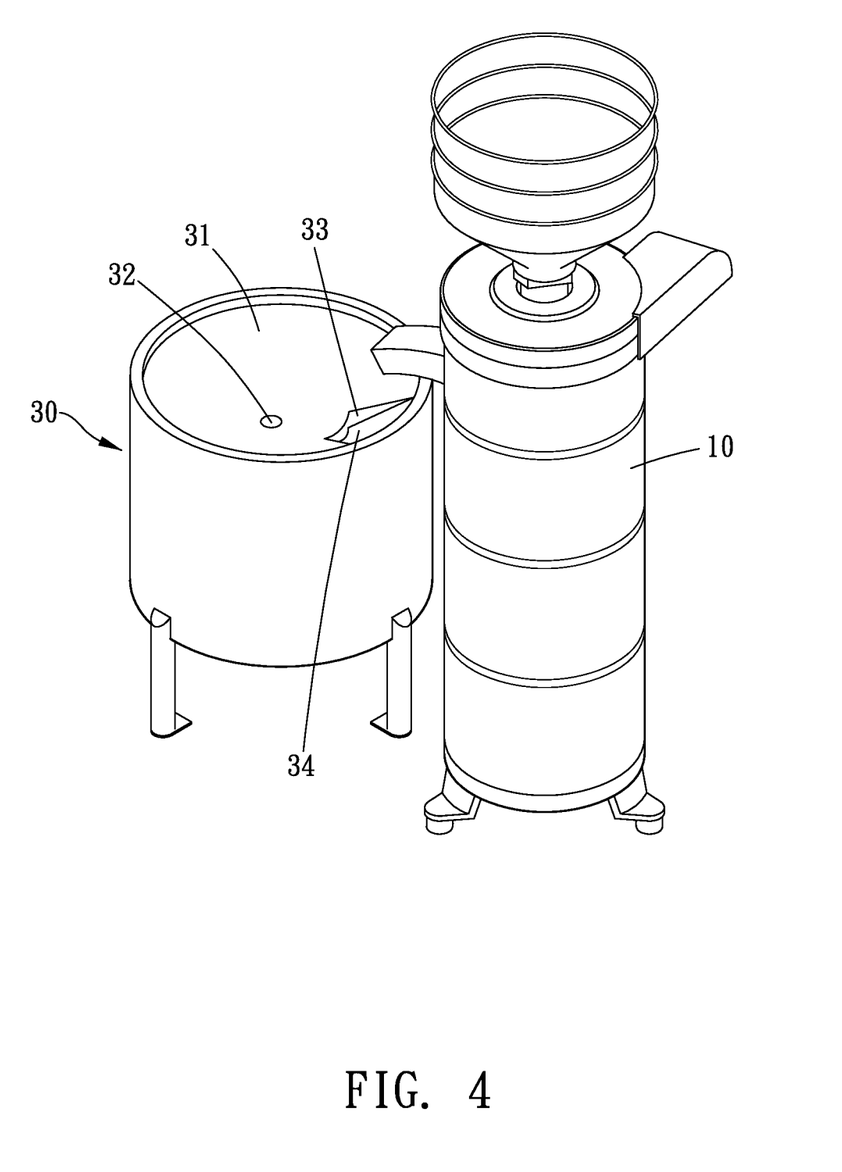
FIG. 4 is a stereogram showing a grinding device and a steamer of the present invention.

The grinding device 10 is adapted for blending and grinding soybeans with water to form bean dregs and raw bean pulp. Specifically, soybeans and water are grinded by the grinding device 10 to form mud-like bean pulp, and the mud-like bean pulp is further filtered into bean dregs and raw bean pulp by a centrifugal filter wherein the bean dregs are discharged.

The bean supplier 20 is adapted for supplying a predetermined amount of soybeans to the grinding device 10. In the present embodiment, the bean supplier 20 includes a vacuum bean sucking device 21 and a bean dosing device 22. The vacuum bean sucking device 21 sucks soybeans into the bean dosing device 22 by a vacuum motor, and the bean dosing device 22 is adapted for supplying a predetermined amount of soybeans to the grinding device 10.

The steamer 30 is adapted for boiling the raw bean pulp made by the grinding device 10 to form bean pulp. If necessary, water can be added into the steamer to adjust the concentration of the bean pulp. In the present embodiment, the steamer 30 includes a cover 31 whose top is formed with a recessed conical collecting trough. The cover 31 is formed with a lower backflow hole 32 and a higher overflow hole 33, and a blocking plate 34 is disposed beside the overflow hole 33 to prevent the bean pulp from splashing. The backflow hole 32 is connected with a tube which extends toward the inside of the steamer 30. Thereby, bubbles overflows out via the overflow hole and becomes liquid. The liquid further flows back into the steamer 30 via the backflow hole 32 so that the bubbles may not spill.

Figure 5:
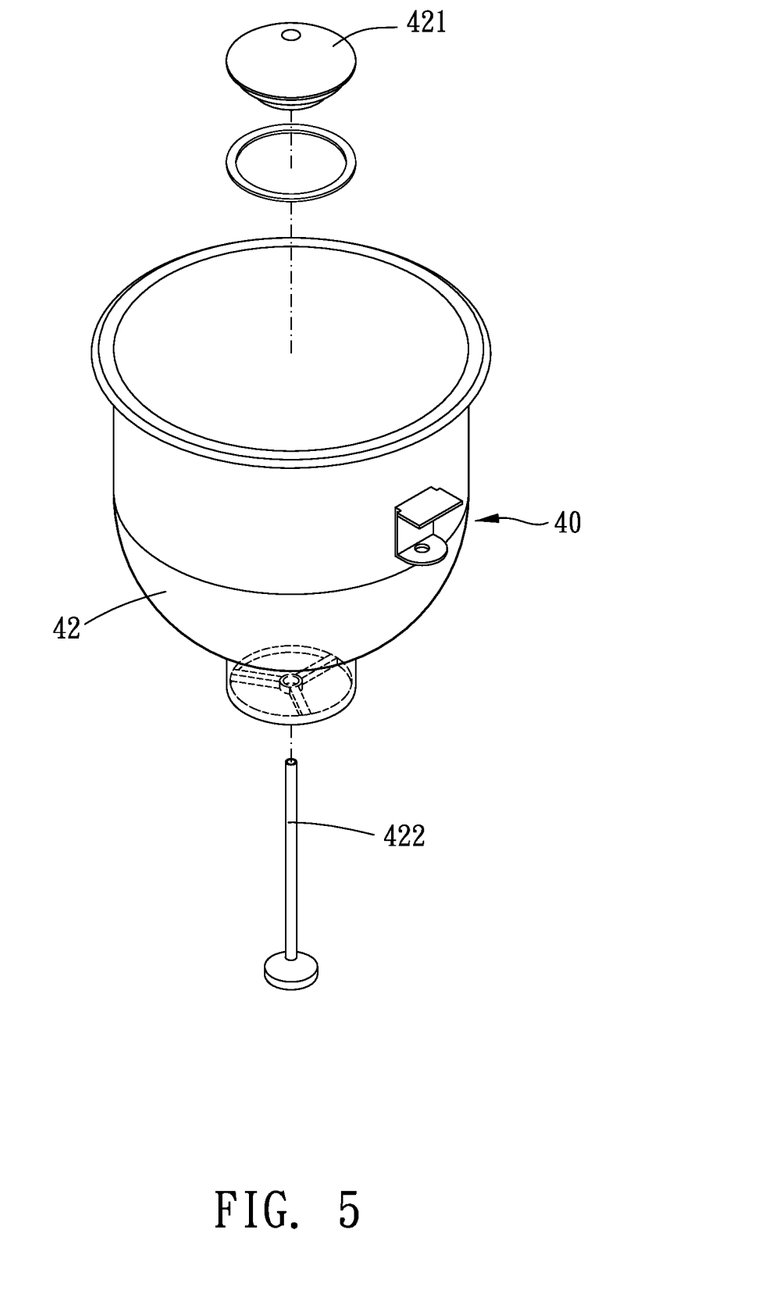
FIG. 5 is a breakdown drawing showing a stirring tank of the present invention.
Figure 6:
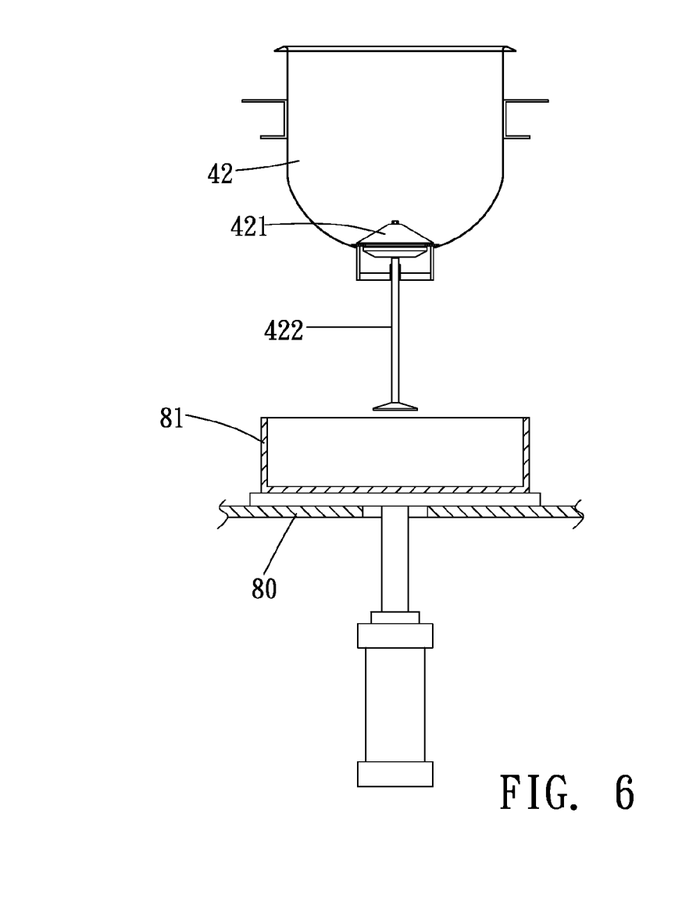
FIG. 6 is an illustration of the present invention when the covering plate hasn't been lifted.
Figure 7:
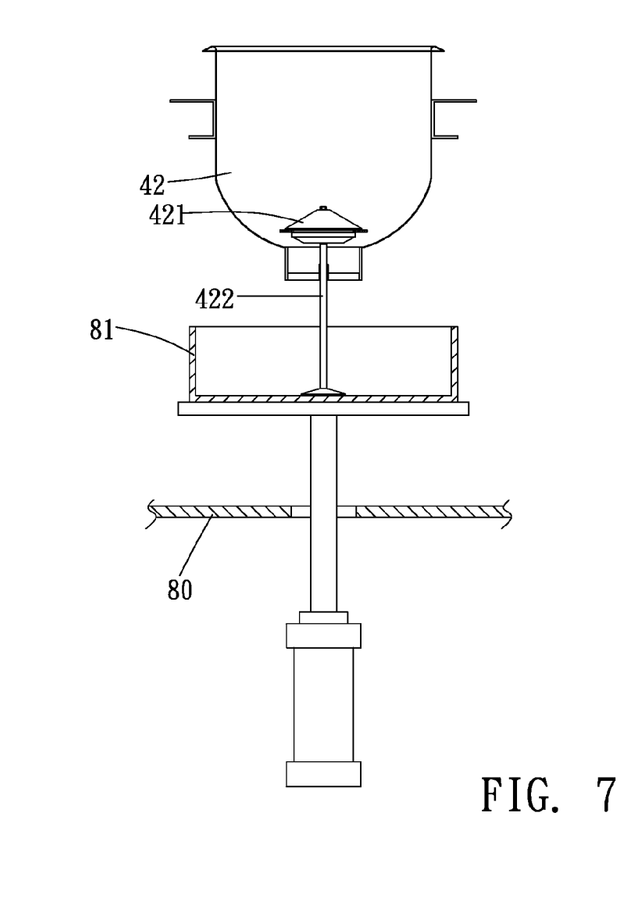
FIG. 7 is an illustration of the present invention when the covering plate has been lifted.

The stirring tank 40 is adapted for stirring and blending the bean pulp and the coagulator to form soy custard. In the present embodiment, the stirring tank 40 includes a first stirring device 41, a plurality of tanks 42, and a rotary platform 43. The tanks are arranged around a rotary axis of the rotary platform 43. By rotating the rotary platform 43, one of the tanks 42 is moved to a working position for the first stirring device 41 to stir. More specifically, position of the first stirring device 41 corresponds to the working position. The first stirring device 41 includes a stirring member 411 and a flow-disturbing plate 412 which is erected in the tank 42 to disturb flow of the bean pulp and the coagulator. Besides, each tank 42 is formed with an opening at a bottom thereof, and a covering plate 421 is disposed on the opening to close the opening. When the covering plate 421 is pushed upward, the covering plate 421 is moved away from the opening to open the opening. More specifically, the covering plate 421 is formed with a pushing rod 422 extending downward from a bottom of the covering plate 421. The pushing rod 422 is adapted for being pushed to lift the covering plate 421 so as to open the opening. Thereby, the tanks 42 alternatively receive the bean pulp and the coagulator by rotating the rotary platform 43, and the bean pulp and the coagulator are stirred by the first stirring device 41. After the tanks 42 all receive bean pulp and the coagulator respectively and the mixture is left to stand for a while, the tanks 42 are moved to the working position one by one to release the soy custard into the molding device 80.

The bean pulp supplier 50 is adapted for guiding the bean pulp made by the steamer 30 to the stirring tank 40. In the present embodiment, the bean pulp supplier 50 includes a first pulp conduit 51, a second pulp conduit 52, and a fifth valve 53. The first pulp conduit 51 extends to the stirring tank 40 to supply bean pulp to the stirring tank 40, and the second pulp conduit 52 extends further to supply bean pulp for drinking or other purposes. The fifth valve 53 is disposed between the first pulp conduit 51 and the second pulp conduit 52 and is adapted for allowing the bean pulp to enter one of the first pulp conduit 51 and the second pulp conduit 52 alternatively. Specifically, the first pulp conduit 51 is located beside the first stirring device 41 to supply bean pulp to the tank 42 which is located at the working position.

The coagulator tank 70 is adapted for receiving the coagulator and includes a pump 71, a second stirring device 72, an outlet conduit 73, and an inlet conduit 74. The pump 71 is adapted for pumping the coagulator in via the inlet conduit 74 and for discharging the coagulator out via the outlet conduit 73. The second stirring device 72 is adapted for stirring the coagulator in the coagulator tank 70 to prevent it from precipitating.

Figure 8:
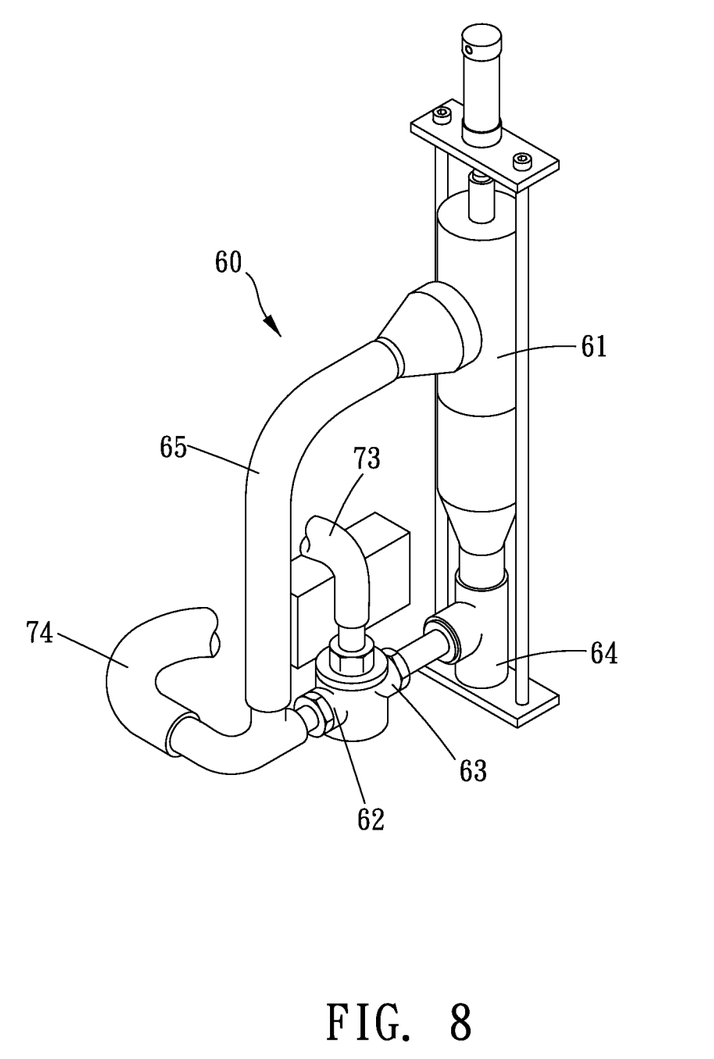
FIG. 8 is a stereogram showing a coagulator dosing device of the present invention.

The coagulator dosing device 60 is located beside the first stirring device 41 to supply coagulator to the tank 42 which is located at the working position. More specifically, the coagulator dosing device 60 includes a coagulator dosing cylinder 61, a first valve 62, a second valve 63, a third valve 64, and a draining conduit 65. The first valve 62 is located between the outlet conduit 73 and the inlet conduit 74. The second valve 63 is located between a bottom of the coagulator dosing cylinder 61 and the outlet conduit 73. The third valve 64 is located on the bottom of the coagulator dosing cylinder 61 and is adapted for allowing the coagulator in the coagulator dosing cylinder 61 to be discharged into the stirring tank 40. An end of the draining conduit 65 is connected to a position of the coagulator dosing cylinder 61 which is located at a predetermined height from the bottom of the coagulator dosing cylinder 61, and an other opposite end of the draining conduit 65 is connected to the inlet conduit 74.

Figure 9:
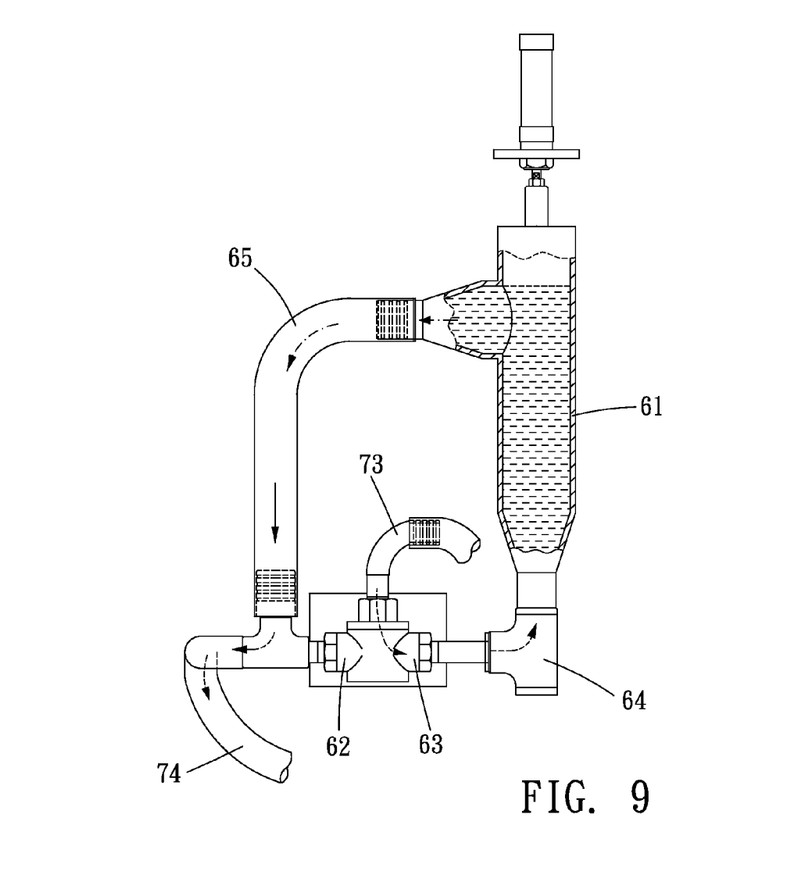
FIG. 9 is an illustration of the present invention when the coagulator hasn't been released from the coagulator dosing cylinder.
Figure 10:
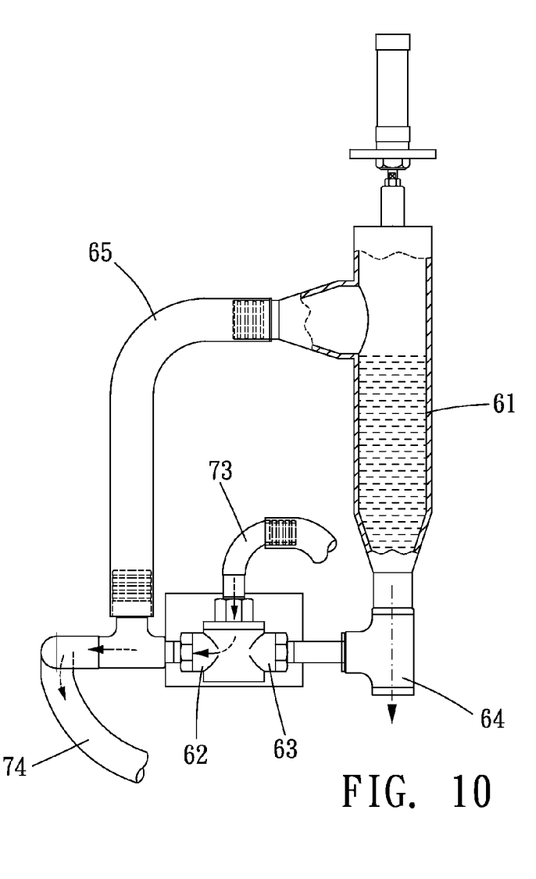
FIG. 10 is an illustration of the present invention when the coagulator is released from the coagulator dosing cylinder.

Thereby, when the first valve 62 is opened, and the second valve 63 and the third valve 64 are closed, as shown in FIG. 9, the coagulator flows into the coagulator dosing cylinder 61 to accumulate from the outlet conduit 73 via the first valve 62. Excess coagulator flows back into the inlet conduit 74 via the draining conduit 65. On the contrary, when the first valve 62 is closed, and the second valve 63 and the third valve 64 are opened, as shown in FIG. 10, the coagulator flows into the inlet conduit 74 from the outlet conduit 73 via the second valve 63. The coagulator accumulated in the coagulator dosing cylinder 61 is discharged into the stirring tank 40 via the third valve 64. By operating in the two modes alternatively, a predetermined amount of the coagulator can be supplied to the stirring tank intermittently. In addition, the coagulator in the coagulator tank 70 and the coagulator dosing device 60 are kept flowing continuously and circulating to prevent the coagulator from precipitating.

The molding device 80 is located below the stirring tank 40 and is liftable. The molding device 80 includes a molding container 81 which is able to push the pushing rod 422 of the tank 42 at the working position upward so as to allow the opening of the tank 42 is opened. Thereby, the soy custard in the tank 42 falls into the molding container 81 to be molded therein. In the present embodiment, the molding device includes a hydraulic cylinder or other lifting device to lift the molding container.

The pressing device 90 is adapted for pressing the soy custard in the molding container 81 to drain water out. Specifically, a cloth can be set up in the molding container to wrap the soy custard. The pressing device presses the wrapped soy custard to drain water and air out. After pressing, the soy custard is left stand for a while for shaping to a bean curd product.

The water tank 100 includes a water conduit 101 extending outward from the water tank 100. The water conduit 101 has two outflow ports 1011, 1012 and a fourth valve 1013 disposed between the two outflow ports 1011, 1012. The fourth valve 1013 is adapted for allowing water in the water tank 100 to flow out via one of the outflow ports 1011, 1012. One of the outflow ports 1012 extends to the steamer 30 to supply water for adjusting concentration of the bean pulp, and the other one outflow port 1011 extends to the grinding device 20 to supply water for grinding.

Besides, the automatic bean curd maker of the present invention optionally includes a computer control system. The computer control system is adapted for controlling all the steps including sucking beans, bean dosing, grinding, water supplying, boiling, flowing direction of the bean pulp, coagulator supplying, stirring, rotary platform rotating, molding device lifting, and pressing by the pressing device. Thus, the bean curd product can be produced automatically and continuously.

In conclusion, the automatic bean curd maker of the present invention is advantageous in several aspects:
1. Procedure of bean curd producing is standardized and automatic, and the process time and man power are reduced.
2. Different kinds of soybean products are possible to produce by a single device.
3. The coagulator is prevented from precipitating, and the dose of the coagulator is precisely controlled.

What is claimed is:

1. An automatic bean curd maker, which is adapted for producing bean curd wherein the bean curd is made by soybeans and a coagulator, including:
   a grinding device, adapted for grinding the soybeans and for blending the soybeans and water in order to form bean dregs and raw bean pulp;
   a bean supplier, adapted for supply a predetermined amount of soybeans to the grinding device;
   a steamer, adapted for boiling the raw bean pulp made by the grinding device in order to form bean pulp;
   at least one stirring tank, including a first stirring device, the stirring tank being adapted for receiving and stirring the coagulator and the bean pulp made by the steamer in order to form soy custard, the stirring tank being formed with an opening on a bottom thereof, the opening being closed by a covering plate, the opening being opened when the covering plate is pushed upward;
   a bean pulp supplier, adapted for supplying the bean pulp made by the steamer to the stirring tank;
   a coagulator tank, adapted for receiving the coagulator, including a pump, a second stirring device, an output conduit, and an input conduit, the pump being adapted for pumping the coagulator in via the input conduit and for discharging the coagulator out via the output conduit, the second stirring device being adapted for stirring the coagulator received in the coagulator tank;
   a coagulator dosing device, including a coagulator dosing cylinder, a first valve, a second valve, a third valve, and a draining conduit, the first valve being disposed between the outlet conduit and the inlet conduit, the second valve being disposed between a bottom of the coagulator dosing cylinder and the outlet conduit, the third valve being disposed on the bottom of the coagulator dosing cylinder so as to alternatively allow the coagulator in the coagulator dosing to be discharged into the stirring tank, an end of the draining conduit being connected to a portion of the coagulator dosing cylinder which is located at a predetermined height from the bottom of the coagulator dosing cylinder, an opposite end of the draining conduit being connected to the inlet conduit;
   a molding device, being located below the stirring tank and being liftable, the molding device including a molding container which is able to push the covering plate in order to open the opening when lifted so as to allow the soy custard to fall into the molding container, the soy custard being molded in the molding container;
   a pressing device, adapted for pressing the soy custard in the molding container for extracting water in order to form bean curd;
   wherein a system composed of the first valve, the second valve, and the third valve is switchable between a first mode and a second mode,
   wherein when the system is at the first mode, the first valve is opened, and the second valve and the third valve are both closed, the coagulator enters the coagulator dosing cylinder from the outlet conduit via the first valve, and excess coagulator flows back into the inlet conduit via the draining conduit; and
   wherein when the system is at the second mode, the first valve is closed, and the second valve and the third valve are both opened, coagulator from the coagulator tank flows to the inlet conduit from the outlet conduit via the second valve, and the coagulator accumulated in the coagulator dosing cylinder is discharged into the stirring tank via the third valve.

2. The automatic bean curd maker of claim 1, wherein the stirring tank includes a rotary platform, plural tanks, and the first stirring device, and wherein the tanks are arranged around a rotary axis of the rotary platform such that one of the tanks is moved to a working position for the first stirring device to stir when the rotary platform rotates.

3. The automatic bean curd maker of claim 2, wherein the bean pulp supplier and the coagulator dosing device are located near the first stirring device and are adapted for supplying the bean pulp and coagulator respectively to the tank located at the working position.

4. The automatic bean curd maker of claim 1, wherein the covering plate of the stirring tank is formed with pushing rod extending downward from a bottom of the covering plate, when the molding device is lifted, a bottom of the molding container pushes the pushing rod upward so as to lift the covering plate for opening the opening, the soy custard in the stirring tank thereby falls into the molding container.

5. The automatic bean curd maker of claim 1, further including a water tank and a water conduit extending outward from the water tank, the water conduit having two outflow ports and a fourth valve disposed between the two outflow ports, the fourth valve alternatively allowing water in the water tank to flow out via one of the outflow ports, one of the outflow ports extending to the steamer to supply water to the steamer, the other outflow port extending to the grinding device to supply water to the grinding device.

6. The automatic bean curd maker of claim 1, wherein the bean pulp supplier includes a first pulp conduit, a second pulp conduit, and a fifth valve, the first pulp conduit extends to the stirring tank to supply the bean pulp to the stirring tank, the second pulp conduit is adapted for supply the bean pulp directly, the fifth valve is disposed between the first pulp conduit and the second pulp conduit and is adapted for supplying the bean pulp made by the steamer to one of the first pulp conduit and the second pulp conduit alternatively.

7. The automatic bean curd maker of claim 1, wherein the bean supplier includes a vacuum bean sucking device and a bean dosing device, the vacuum bean sucking device sucks soybeans into the bean dosing device by a vacuum motor, the bean dosing device is adapted for supply a predetermined amount of soybeans to the grinding device.

8. The automatic bean curd maker of claim 1, wherein the first stirring device includes a stirring member and a flow-disturbing plate, the flow-disturbing plate is erected in the stirring tank.

* * * * *